(12) United States Patent
Kamada et al.

(10) Patent No.: US 11,141,963 B2
(45) Date of Patent: Oct. 12, 2021

(54) SURFACE PROTECTIVE FILM

(71) Applicants: BANDO CHEMICAL INDUSTRIES, LTD., Hyogo (JP); WACOM CO., LTD., Saitama (JP)

(72) Inventors: Yutaka Kamada, Hyogo (JP); Arata Tani, Hyogo (JP); Toshihiko Horie, Saitama (JP); Soh Kato, Saitama (JP)

(73) Assignees: BANDO CHEMICAL INDUSTRIES, LTD., Hyogo (JP); WACOM CO., LTD., Saitama (JP)

( * ) Notice: Subject to any disclaimer, the term of this patent is extended or adjusted under 35 U.S.C. 154(b) by 25 days.

(21) Appl. No.: 16/327,316

(22) PCT Filed: Aug. 22, 2017

(86) PCT No.: PCT/JP2017/029850
§ 371 (c)(1),
(2) Date: Feb. 21, 2019

(87) PCT Pub. No.: WO2018/038069
PCT Pub. Date: Mar. 1, 2018

(65) Prior Publication Data
US 2019/0184676 A1 Jun. 20, 2019

(30) Foreign Application Priority Data
Aug. 24, 2016 (JP) .............................. JP2016-163902

(51) Int. Cl.
*B32B 27/08* (2006.01)
*B32B 27/40* (2006.01)
(Continued)

(52) U.S. Cl.
CPC ................ *B32B 27/08* (2013.01); *B32B 7/02* (2013.01); *B32B 7/027* (2019.01); *B32B 27/36* (2013.01);
(Continued)

(58) Field of Classification Search
CPC .... G02B 1/14; G06F 3/041; B32B 7/00–7/14; B32B 27/00–27/42; C08G 18/00–18/87
See application file for complete search history.

(56) References Cited

U.S. PATENT DOCUMENTS

| | | | |
|---|---|---|---|
| 2002/0001723 A1* | 1/2002 | Fuchs | B32B 27/40 428/424.4 |
| 2003/0000568 A1* | 1/2003 | Gonsiorawski | B32B 17/10036 136/251 |
| 2017/0290182 A1* | 10/2017 | Roberts | B32B 27/40 |

FOREIGN PATENT DOCUMENTS

| | | |
|---|---|---|
| CN | 101522417 | 9/2009 |
| CN | 104558503 | 4/2015 |

(Continued)

OTHER PUBLICATIONS

Machine translation of JP2012067259. Retrieved Aug. 27, 2020.*
(Continued)

*Primary Examiner* — Prashant J Khatri
(74) *Attorney, Agent, or Firm* — JCIPRNET

(57) ABSTRACT

The present invention addresses the problem of providing a surface protective film which is resistant to discoloration, expansion and the like caused by the penetration of a plasticizer. A surface protective film having, on the outermost surface thereof, a protective layer made of polycarbonate type polyurethane is provided as the solution of the problem.

7 Claims, 2 Drawing Sheets

(51) Int. Cl.

| | | |
|---|---|---|
| *C08J 5/18* | (2006.01) | |
| *C08G 18/44* | (2006.01) | |
| *G06F 3/041* | (2006.01) | |
| *C08G 18/24* | (2006.01) | |
| *C08G 18/32* | (2006.01) | |
| *C08G 18/66* | (2006.01) | |
| *C08G 18/75* | (2006.01) | |
| *C09D 175/06* | (2006.01) | |
| *B32B 7/02* | (2019.01) | |
| *B32B 27/36* | (2006.01) | |
| *G02B 5/30* | (2006.01) | |
| *C08J 7/043* | (2020.01) | |
| *C08J 7/046* | (2020.01) | |
| *B32B 7/027* | (2019.01) | |
| *B32B 7/022* | (2019.01) | |
| *B32B 7/023* | (2019.01) | |

(52) U.S. Cl.
CPC ............ *B32B 27/365* (2013.01); *B32B 27/40* (2013.01); *C08G 18/24* (2013.01); *C08G 18/3206* (2013.01); *C08G 18/44* (2013.01); *C08G 18/6644* (2013.01); *C08G 18/755* (2013.01); *C08J 5/18* (2013.01); *C08J 7/043* (2020.01); *C08J 7/046* (2020.01); *C09D 175/06* (2013.01); *G02B 5/30* (2013.01); *G06F 3/041* (2013.01); *B32B 7/022* (2019.01); *B32B 7/023* (2019.01)

(56) References Cited

FOREIGN PATENT DOCUMENTS

| CN | 205167763 | | | 4/2016 |
|---|---|---|---|---|
| JP | H07141107 | | | 6/1995 |
| JP | 2003001648 | | | 1/2003 |
| JP | 2007108443 | | | 4/2007 |
| JP | 2007137052 | | | 6/2007 |
| JP | 2007207091 | | | 8/2007 |
| JP | 2008114387 | | | 5/2008 |
| JP | 2011236335 | | | 11/2011 |
| JP | 2012067259 | A | * | 4/2012 |
| JP | 2012196868 | | | 10/2012 |
| JP | 2013027998 | | | 2/2013 |
| JP | 2013249455 | | | 12/2013 |
| JP | 2015034266 | A | * | 2/2015 |
| JP | 2015105993 | A | * | 6/2015 |
| KR | 20150000745 | A | * | 1/2015 |
| WO | 2017094480 | | | 6/2017 |

OTHER PUBLICATIONS

Machine translation of JP2015034266. Retrieved Aug. 27, 2020.*
Machine translation of KR20150000745. Retrieved Aug. 27, 2020.*
Hwang et al. "UV-curing behavior and physical properties of waterborne UV-curable polycarbonate-based polyurethane dispersion". Progress in Organic Coatings, 72, (2011); pp. 663-675.*
Machine translation of JP2011236335. Retrieved Mar. 22, 2021.*
Machine translation of JP2015105993. Retrieved Mar. 24, 2021.*
"Shin-Etsu Reactive & Non-Reactive Modified Silicone Fluid". Shin-Etsu Chemical Co., Ltd., (2016); pp. 1-10.*
"International Preliminary Report On Patentability; this report contains the following items :Form PCT/IB/326, PCT/IB/338, PCT/IB/373, PCT/ISA237(cover sheet), PCT/ISA237(Box No. 1), PCT/ISA237(Box No. V)", dated Mar. 7, 2019, Feb. 26, 2019 and Nov. 28, 2017, which is English translation of "Written Opinion of the International Searching Authority", p. 1-p. 19.
"International Search Report (Form PCT/ISA/210) of PCT/JP2017/029850," dated Nov. 28, 2017, with English translation thereof, pp. 1-4.
Office Action of China Counterpart Application, with English translation thereof, dated Jul. 30, 2020, pp. 1-15.
"Office Action of China Counterpart Application" with English translation thereof, dated Mar. 23, 2021, p. 1-p. 18.

* cited by examiner

SURFACE PROTECTIVE FILM

CROSS-REFERENCE TO RELATED APPLICATION

This application is a 371 application of the international PCT application serial no. PCT/JP2017/029850, filed on Aug. 22, 2017, which claims the priority benefit of Japan application no. 2016-163902, filed on Aug. 24, 2016. The entirety of each of the abovementioned patent applications is hereby incorporated by reference herein and made a part of this specification.

TECHNICAL FIELD

The present invention relates to a surface protective film for protecting a transparent substrate on a display surface.

DESCRIPTION OF RELATED ART

In portable electronic devices including a display such as smartphones, tablet personal computers (PC), and music players, in order to protect a transparent substrate on a display surface, a surface protective film is laminated thereon in some cases. Light transmission properties, transparency, scratch resistance, weather resistance and the like are required for the surface protective film. In addition, in recent years, portable electronic devices have been generally operated through a capacitance touch panel, and antifouling properties for preventing sebum from remaining thereon, allowing a feeling of writing with a touch pen, sliding properties thereof, self-repairing properties for restoring a film pushed by a tip of a touch pen to its original state over time, and the like have been additionally required.

As a surface protective film, for example, in Patent Literature 1, a protective film having a soft resin layer including a urethane (meth)acrylate, a fluorine-containing compound and/or a compound having a siloxane bond on one surface of a transparent substrate film is proposed.

In Patent Literature 2, an invention of a self-repairing laminate including a substrate film and a self-repairing resin layer is proposed.

In addition, in Patent Literature 3, the applicants proposed a surface protective film in which three layers including a protective layer formed of a thermosetting polyurethane which is a cured product of a polyether polyol, an aliphatic isocyanate, an alcohol-based curing agent, and a non-amine type catalyst, a transparent substrate film, and an adhesive layer are laminated in that order.

Portable electronic devices come in contact with various plastic products such as an earphone cord wound therearound, and chargers, USB cables, writing materials, and cosmetics inside bags and the like. When a plastic product comes in contact with a surface protective film, a plasticizer contained in the plastic product penetrates into the surface protective film, and discoloration, expansion, and the like may occur in the surface protective film. In particular, since rubber products such as a USB cable and an earphone cord contain a large amount of plasticizers, discoloration, expansion, and the like easily occur in the surface protective film due to contact therewith.

REFERENCE LIST

Patent Literature

[Patent Literature 1]
Japanese Patent Application Laid-Open No. 2012-196868

[Patent Literature 2]
Japanese Patent Application Laid-Open No. 2013-27998

[Patent Literature 3]
PCT International Publication No. WO 2017/094480, pamphlet

SUMMARY

Technical Problem

An objective of the present invention is to provide a surface protective film which is resistant to discoloration, expansion, and the like caused by penetration of a plasticizer.

Solution to Problem

In order to achieve the above objective, the present invention has the following configurations.

1. A surface protective film includes a protective layer formed of a polycarbonate type polyurethane on the outermost surface.

2. The surface protective film according to 1, wherein at least three layers including the protective layer, a transparent substrate film, and an adhesive layer are laminated in that order.

3. The surface protective film according to 1 or 2, wherein the polycarbonate type polyurethane is a cured product of a material composition containing a polycarbonate type polyol, an isocyanate, and an alcohol-based curing agent.

4. The surface protective film according to any one of 1 to 3, wherein the protective layer contains a silicone-based additive.

5. The surface protective film according to any one of 1 to 4, wherein the thickness of the protective layer is 50 μm or more and 300 μm or less.

6. The surface protective film according to any one of 1 to 5, wherein a haze value is 0.1% or more and 40% or less.

7. A surface protective film laminate includes a mold release film laminated on a surface on the side of the protective layer of the surface protective film according to any one of 1 to 6, and a release film laminated on the other surface.

8. A method of producing a surface protective film including a protective layer formed of a polycarbonate type polyurethane on the outermost surface, comprises:
pouring a material composition containing a polycarbonate type polyol, an isocyanate, an alcohol-based curing agent, and a catalyst into a gap between first and second gap maintaining members that are conveyed by a pair of rollers that are disposed apart from each other; and
thermally curing the material composition that is held between the first and second gap maintaining members to form the protective layer.

9. The method of producing a surface protective film according to 8, wherein one of the first and second gap maintaining members is used as a transparent substrate film of the surface protective film.

10. The method of producing a surface protective film according to 8 or 9, wherein the material composition contains a silicone-based additive.

11. The method of producing a surface protective film according to any one of 8 to 10, wherein one of the first and second gap maintaining members is a film on which no mold release treatment is performed and the other thereof is a film on which a mold release treatment is performed.

12. The method of producing a surface protective film according to any one of 8 to 11, wherein the other of the first and second gap maintaining members is a film having irregularities and the material composition is held on a surface having irregularities.

Advantageous Effects of Invention

A surface protective film of the present invention has a protective layer formed of a polycarbonate type polyurethane on the outermost surface. In the surface protective film of the present invention, even if a protective layer comes in contact with a plastic product, a plasticizer is unlikely to penetrate thereinto and discoloration, expansion, and the like are unlikely to occur. The surface protective film of the present invention has light transmission properties, transparency, scratch resistance, weather resistance, and self-repairing properties. In addition, the surface protective film of the present invention allows excellent operability with a touch pen, and a feeling of writing equivalent to that on paper with a pen is obtained. In addition, the surface protective film of the present invention containing a silicone-based additive has favorable sliding properties, and it is possible to perform an operation on a touch panel with a touch pen, a finger, or the like very comfortably.

In the surface protective film of the present invention, irregularities can be formed on the outermost surface of the protective layer to impart anti-glare properties. In addition, the surface protective film of the present invention has suitable optical characteristics for a surface protective film even though the protective layer has a thickness of 50 μm or more and 300 μm or less.

Since a surface protective film laminate in which a mold release film and a release film are laminated on the surface protective film of the present invention can prevent contamination, scratches, and the like on the protective layer, and has excellent handling properties.

According to a production method of the present invention, it is possible to continuously produce surface protective films. In addition, in a wet coating method, a protective layer having a thickness of 50 μm or more and 300 μm or less, which is not easily produced, can be produced without optical characteristics deteriorating. In addition, according to a transfer method, it is possible to easily form irregularities on a surface of the protective layer.

DESCRIPTION OF THE EMBODIMENTS

A protective film of the present invention has a protective layer formed of a polycarbonate type polyurethane on the outermost surface.

Figure 1:
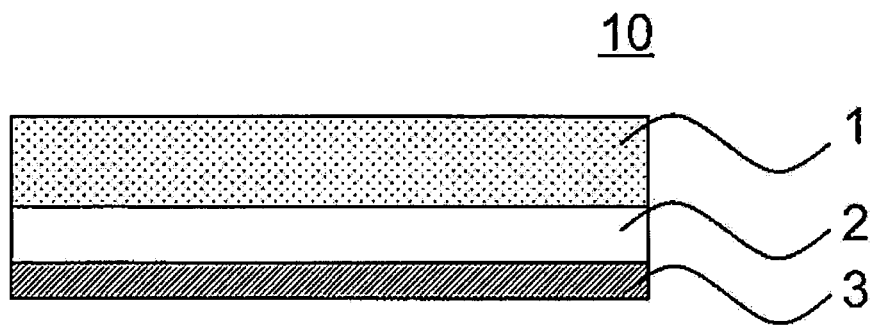
FIG. 1 is a diagram showing a surface protective film according to an embodiment of the present invention.
Figure 2:
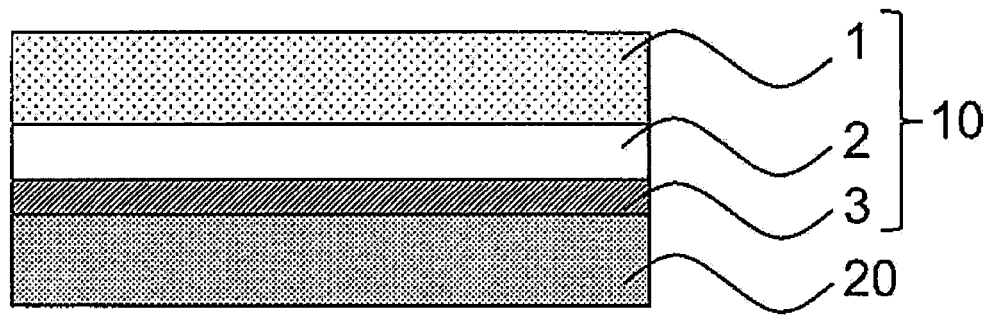
FIG. 2 is a diagram showing a state in which a surface protective film according to an embodiment of the present invention is attached to a transparent substrate on a display surface.

FIGS. 1 and 2 show a surface protective film 10 according to an embodiment of the present invention and a state in which the surface protective film 10 according to the embodiment is laminated on a transparent substrate 20 positioned on a display surface. Here, in FIGS. 1 and 2, the thicknesses of the layers do not reflect actual thicknesses.

In the surface protective film 10 according to the embodiment, three layers including a protective layer 1 formed of a polycarbonate type polyurethane, a transparent substrate film 2, and an adhesive layer 3 are laminated in that order. In addition, the surface protective film 10 according to the embodiment is laminated on the transparent substrate 20 positioned on the outermost surface of a display with the adhesive layer 3 therebetween.

In this manner, the surface protective film of the present invention is attached to a surface of the transparent substrate, and thus prevents scratches, cracks, contamination, and the like on the transparent substrate.

"Protective Layer"

The protective layer is formed of a polycarbonate type polyurethane. The polycarbonate type polyurethane refers to a urethane using a polycarbonate type polyol as a polyol component.

a. Polycarbonate Type Polyol

Examples of the polycarbonate type polyol include a reaction product of a dialkyl carbonate and a diol.

Examples of the dialkyl carbonate include a dialkyl carbonate such as dimethyl carbonate and diethyl carbonate, a diaryl carbonate such as diphenyl carbonate, and an alkylene carbonate such as ethylene carbonate. These may be use alone or two or more thereof may be used in combination.

Examples of the diol include 1,4-butanediol, diethylene glycol, 1,5-pentanediol, 1,6-hexanediol, 1,7-heptanediol, 1,8-octanediol, 2-methyl-1,8-octanediol, 1,9-nonanediol, 1,10-dodecanediol, 2-ethyl-1,6-hexanediol, 3-methyl-1,5-pentanediol, 2,4-dimethyl-1,5-pentanediol, neopentyl glycol, 1,3-cyclohexanediol, 1,4-cyclohexanediol, 1,4-cyclohexanedimethanol, and 2,2'-bis (4-hydroxycyclohexyl)-propane. These may be used alone or two or more thereof may be used in combination.

As the diol, an aliphatic or alicyclic diol having 4 to 9 carbon atoms is preferable. For example, 1,4-butanediol, diethylene glycol, 1,5-pentanediol, 1,6-hexanediol, 3-methyl-1,5-pentanediol, 2,4-dimethyl-1,5-pentanediol, 1,4-cyclohexanedimethanol, 1,7-heptanediol, 1,8-octanediol, 2-methyl-1,8-octanediol, and 1,9-nonanediol are preferably used alone or in combination of two or more thereof. In addition, those having no branched structure are more preferable.

In addition, as the polycarbonate type polyol, for example, a polycarbonate glycol, a polycarbonate triol, a polycarbonate tetraol, and derivatives thereof in which a side chain or a branched structure is introduced thereinto, modified products thereof, a mixture thereof, and the like can be used.

The number average molecular weight of the polycarbonate type polyol is preferably 200 or more and 10,000 or less, more preferably 500 or more and 5,000 or less, and most preferably 800 or more and 3,000 or less. When the number average molecular weight is less than 200, a reaction occurs too fast, handling properties deteriorate, and a molded product loses flexibility, and becomes brittle in some cases. On the other hand, when the number average molecular weight is greater than 10,000, the viscosity becomes too high, handling properties deteriorate, and a molded product crystallizes and becomes opaque in some cases. Here, in the present invention, the number average molecular weight refers to a molecular weight that is calculated from a hydroxyl value of a polyol measured according to JIS-K1557. However, values beyond the above numerical value range are not excluded as long as they are within the spirit and scope of the present invention.

b. Isocyanate

The isocyanate can be used without particular limitation as long as it has two or more isocyanate groups in a molecule. For example, tolylene diisocyanate, tolidine diisocyanate, diphenylmethane diisocyanate, polymethylene polyphenyl polyisocyanate, carbodiimidated diphenylmethane polyisocyanate, crude diphenylmethane diisocyanate, xylylene diisocyanate, 1,5-naphthalene diisocyanate, tetramethylxylylene diisocyanate, isophorone diisocyanate, hydrogenated diphenylmethane diisocyanate, hydrogenated xylylene diisocyanate, hexamethylene diisocyanate, dimer acid diisocyanate, norbornene diisocyanate, and the like can be used. Among these, two or more types may be used in combination.

In the polycarbonate type polyurethane used to form the protective layer of the present invention, as an isocyanate component, an aliphatic isocyanate having no aromatic ring is preferably used. The polyurethane obtained from an aliphatic isocyanate is unlikely to yellow and can prevent the polyurethane from discoloring due to light and heat from a light source, sunlight, and the like and can prevent transparency from deteriorating.

c. Alcohol-Based Curing Agent

In the polycarbonate type polyurethane used to form the protective layer of the present invention, an alcohol-based curing agent is used as a curing agent. The alcohol-based curing agent has a weaker adverse effect on human bodies and the environment than an amine-based curing agent.

The alcohol-based curing agent can be used without particular limitation as long as it has two or more hydroxy groups in a molecule. For example, dihydric alcohols such as ethylene glycol, 1,3-propanediol, 2-methyl-1,3-propanediol, 1,3-butanediol, 1,4-butanediol, 1,5-pentanediol, neopentyl glycol (2,2-dimethyl-1,3-propanediol), 1,6-hexanediol, polyethylene glycol, polypropylene glycol, polybutylene glycol, cyclohexane dimethanol, and a hydrogenated bisphenol A, trihydric alcohols such as glycerin, trimethylolpropane, butanetriol, pentanetriol, hexanetriol, cyclopentanetriol, and cyclohexanetriol, and trihydric or higher alcohols such as pentaerythritol, dipentaerythritol, and tetramethylolpropane may be exemplified. Among these, preferably, a dihydric alcohol is used alone or a combination of a dihydric alcohol and a trihydric alcohol is used. When an amount of the trihydric alcohol is large, the strength of the obtained polyurethane is lowered. Therefore, preferably, the dihydric alcohol is used in a range of 50 to 100 parts by weight, and the trihydric alcohol is used in a range of 50 to 0 parts by weight, and more preferably, the dihydric alcohol is used in a range of 60 to 80 parts by weight, and the trihydric alcohol is used in a range of 40 to 20 parts by weight. In consideration of handling properties and mechanical properties, preferably, 1,4-butanediol is used as the dihydric alcohol, and trimethylolpropane is used as the trihydric alcohol.

d. Catalyst

Preferably, the polycarbonate type polyurethane used to form the protective layer of the present invention is thermally cured in the presence of a non-amine type catalyst. When the non-amine type catalyst is used, it is possible to obtain a polyurethane having excellent non-coloring properties, transparency, and weather resistance. On the other hand, in a polyurethane that is thermally cured in the presence of an amine type catalyst, emitted light turns yellow and an appearance becomes colored over time in some cases.

Examples of the non-amine type catalyst include an organic tin compound such as di-n-butyl tin dilaurate, dimethyl tin dilaurate, dibutyltin oxide, and octane tin, an organic titanium compound, an organic zirconium compound, a carboxylic acid tin salt, and bismuth carboxylate. Among these, an organic tin compound is preferable because a reaction rate is easily adjusted.

0.0005 weight % or more and 3.0 weight % or less of the non-amine type catalyst is preferably added with respect to the total amount of the above a. to c. When the proportion is less than 0.0005 weight %, the reaction rate is not sufficiently high, and it is not possible to efficiently obtain a molded product in some cases. When the proportion is higher than 3.0 weight %, the reaction rate is too high, problems may occurs, for example, it may not be possible to obtain a molded product with a uniform thickness, heat resistance and weather resistance of the molded product deteriorate, light transmittance is lowered, and the molded product is colored. However, values beyond the above numerical value range are not excluded as long as they are within the spirit and scope of the present invention.

The polycarbonate type polyurethane used to form the protective layer can contain various additives such as a colorant, a light stabilizer, a heat stabilizer, an antioxidant, an antifungal agent, a flame retardant, and a lubricant as necessary within a range in which required characteristics are not impaired.

e. Silicone-Based Additive

In the surface protective film of the present invention, the polycarbonate type polyurethane used to form the protective layer preferably contains a silicone-based additive. When the protective layer contains a silicone-based additive, sliding properties are improved, and it is possible to perform an operation on a touch panel with a touch pen, a finger, or the like comfortably. The silicone-based additive can be included in the protective layer by adding it to a material composition before the polycarbonate type polyurethane is thermally cured and thermally curing the material composition. In addition, as the silicone-based additive, a non-reactive additive that does not form a covalent bond with a crosslinked network formed by a polycarbonate type polyol, an isocyanate, and an alcohol-based curing agent is preferably used. Since the non-reactive silicone-based additive gradually bleeds out to the outermost surface of the protective layer, it is possible to impart sliding properties over a long time. The silicone-based additive can be used without particular limitation as long as it is not phase-separated from the material composition before thermal curing. For example, a polyether-modified polydimethylsiloxane, a polyaralkyl-modified polydimethylsiloxane, and a long chain alkyl-modified polydimethylsiloxane can be used. Specifically, commercial products KF352A, KF615A, X22-4515, KF410, KF412, and the like (commercially available from Shin-Etsu Chemical Co., Ltd.) can be used.

The protective layer is a molded product formed of a polycarbonate type polyurethane obtained by curing a material composition containing a polycarbonate type polyol, an isocyanate, and an alcohol-based curing agent in the presence of a catalyst. As a molding method thereof, any of a one shot method, a prepolymer method, and a quasi-prepolymer method may be used. The protective layer can contain optional additives such as a silicone-based additive.

In the one shot method, a polycarbonate type polyol, an isocyanate, an alcohol-based curing agent, optional additives, and a catalyst may be added together and cured to produce a polycarbonate type polyurethane molded product.

In the prepolymer method, a polycarbonate type polyol and a stoichiometrically excess amount of an isocyanate are reacted to prepare a prepolymer having an isocyanate group at its end in advance, predetermined amounts of an alcohol-based curing agent, optional additives, and a catalyst are mixed thereinto, the prepolymer is cured, and thereby a polycarbonate type polyurethane molded product may be produced.

In the quasi-prepolymer method, some of a polycarbonate type polyol is mixed with an alcohol-based curing agent in advance, and the remaining polycarbonate type polyol and an aliphatic polyisocyanate are used to prepare a prepolymer, and a mixture in which a polycarbonate type polyol, an alcohol-based curing agent, optional additives, and a catalyst are mixed together in advance is mixed thereinto, the mixture is cured, and thereby a polycarbonate type polyurethane molded product may be produced.

In the present invention, in the material composition before the polycarbonate type polyurethane is thermally cured, a ratio of the number of moles of hydroxyl groups (—OH) included in an alcohol-based curing agent to the number of moles of isocyanate groups (—NCO) of an aliphatic polyisocyanate or a prepolymer (—OH/—NCO: hereinafter referred to as an a ratio) is preferably 0.8 or more and 1.5 or less. When the ratio is less than 0.8, mechanical properties are unstable, and when the ratio is greater than 1.5, the surface adhesiveness increases and a favorable feeling of writing is impaired.

In addition, the polycarbonate type polyurethane preferably does not have an acrylic framework (an acrylic framework or a methacrylic framework). That is, the polycarbonate type polyurethane used to form the protective layer of the present invention preferably does not contain an acrylic-modified polyurethane. A polycarbonate type polyurethane having an acrylic framework may impair the flexibility of the polyurethane and lower the mechanical strength such as wear resistance and tear strength, and emitted light may be colored due to the acrylic framework or a residue from the catalyst that is used to introduce the acrylic framework.

The thickness of the protective layer is preferably 50 µm or more and 300 µm or less. When the protective layer has a thickness of 50 µm or more and 300 µm or less, a feeling of writing and sliding properties of a touch pen are very good. When the thickness of the protective layer is less than 50 µm, a feeling of writing and self-repairing properties deteriorate, and when the thickness of the protective layer is greater than 300 µm, light transmission properties, transparency, a feeling of writing, sliding properties, and self-repairing properties deteriorate, and it is difficult to perform molding with a uniform thickness. When the thickness is 50 µm or more and 300 µm or less, the performance required for the surface protective film is exhibited in a well-balanced manner, and the production is also easy.

The haze value of the surface protective film of the present invention is 0.1% or more and 40% or less, and the total light transmittance is 90% or more. When the haze value is greater than 40% or the total light transmittance is less than 90%, the visibility of the display deteriorates. When the haze value of the surface protective film is 0.1% or more and less than 3%, the transparency is excellent, and a clear appearance can be obtained. When the haze value of the surface protective film is 3% or more and 40% or less, it is possible to impart anti-glare properties to the surface protective film. In addition, with the surface protective film having anti-glare properties, scratches on the surface of the protective layer are less noticeable. In order to set the haze value of the surface protective film to be 3% or more and 40% or less, irregularities may be formed on the outermost surface of the protective layer. An irregular shape of the outermost surface of the protective layer is not particularly limited as long as the above haze value and total light transmittance are obtained, and may be appropriately adjusted according to a refractive index, light absorbency, and the like of a material to be used, and in general, an average length (RSm) of a roughness curve element is about 10 µm or more and 80 µm or less. In addition, the arithmetic average roughness Ra is about 0.01 µm or more and 0.3 µm or less, and the maximum height Rz is about 0.1 µm or more and 2.0 µm or less.

"Transparent Substrate Film"

The transparent substrate film holds the protective layer. A material constituting the transparent substrate film can be used without particular limitation as long as it has excellent transparency, flexibility, and mechanical strength, and polyethylene terephthalate (PET), polyethylene naphthalate (PEN), polycarbonate (PC), a cyclic olefin resin (COP), polyimide (PI), and the like can be suitably used.

The thickness of the transparent substrate film is preferably 50 µm or more and 500 µm or less. The protective layer of the surface protective film of the present invention is formed of a polycarbonate type polyurethane. A coefficient of thermal expansion of the polycarbonate type polyurethane used to form the protective layer is generally higher than a coefficient of thermal expansion of a material constituting the transparent substrate film. Therefore, when the thickness of the transparent substrate film is less than 50 µm, due to shrinkage of the protective layer at low temperatures, inner stress is applied to an end of the transparent substrate film, and the surface protective film may peel off from the transparent substrate. When the thickness of the transparent substrate film is greater than 500 µm, the surface protective film becomes bulky and costs increase. In addition, the operability during lamination on a touch panel type display surface deteriorates. Here, as will be described below in detail in "Method of producing a protective layer," the protective layer can be directly molded on the transparent substrate film. In this case, in order to prevent deformation due to heat when the material composition is thermally cured, the transparent substrate film is preferably thick. However, values beyond the above numerical value range are not excluded as long as they are within the spirit and scope of the present invention.

"Adhesive Layer"

Using the adhesive layer, the surface protective film of the present invention is laminated on the transparent substrate on the outermost surface of the display. The type of the adhesive is not particularly limited, and an acrylic resin, an epoxy resin, a urethane resin, and a silicone resin can be used. Among these, an acrylic resin can be attached to a surface substrate on which a surface treatment such as an antifouling treatment and a low reflection treatment is performed. In addition, a silicone resin has excellent wetting properties, causes less bubbles when it is attached to a transparent substrate, and has favorable removable properties, and is unlikely to leave an adhesive residue when peeled off. The thickness of the adhesive layer is generally within a range of 5 µm or more and 60 µm or less, and can be appropriately adjusted according to required specifications.

Figure 3:
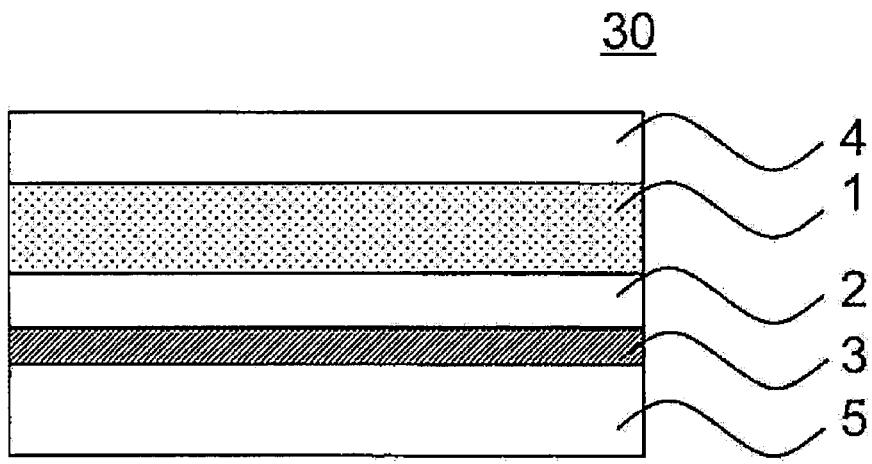
FIG. 3 is a diagram showing a surface protective film laminate according to an embodiment of the present invention.

In order to protect the surface protective film of the present invention from when the surface protective film is produced until the surface protective film is attached to the transparent substrate and used, a mold release film is adhered to a surface on the side of the protective layer of the surface protective film and a release film is adhered to the other surface, and thereby a surface protective film laminate can be obtained. FIG. 3 shows a surface protective film laminate 30 in which a mold release film 4 and a release film 5 are adhered to the surface protective film 10 according to the embodiment. Here, in FIG. 3, the thicknesses of the layers do not reflect actual thicknesses.

The mold release film is provided to prevent contamination and adhesion of dust to the protective layer, and the like, and a film subjected to a mold release treatment on a surface on the side on which lamination is performed is preferably used. When the mold release film on which a mold release treatment is performed is peeled off from the protective layer, a mold releasing agent is transferred from the mold release film to the surface of the protective layer, sliding properties can be imparted to the surface of the protective layer immediately after the mold release film is peeled off, and a touch operation can be performed without discomfort. In addition, as will be described below in detail in "method of producing a protective layer," the protective layer can be directly molded on the mold release film. In this case, in order to prevent deformation due to heat when the material composition is thermally cured, the thickness of the mold release film is preferably 50 μm or more and 300 μm or less, and a thicker film is more preferable.

The release film protects a surface on the side opposite to the side of the protective layer of the outermost surface of the surface protective film, and protects, for example, the adhesive layer. For the release film, a film on which a mold release treatment is performed on a surface on the side on which lamination is performed can be suitably used. In the embodiment shown in FIG. 3, the adhesive layer 3 is protected, and contamination, adhesion of dust, decrease in adhesive force, and the like are prevented.

"Method of Producing Protective Layer"

The protective layer is produced when a material composition containing at least a polycarbonate type polyol, an isocyanate (or a urethane prepolymer including them), an alcohol-based curing agent, optional additives, and a non-amine type catalyst is sent to a gap between gap maintaining members that are conveyed by a pair of rollers which are disposed apart from each other, and while the material composition that is held between the gap maintaining members is introduced into a heating device, and thermally cured.

Figure 4:
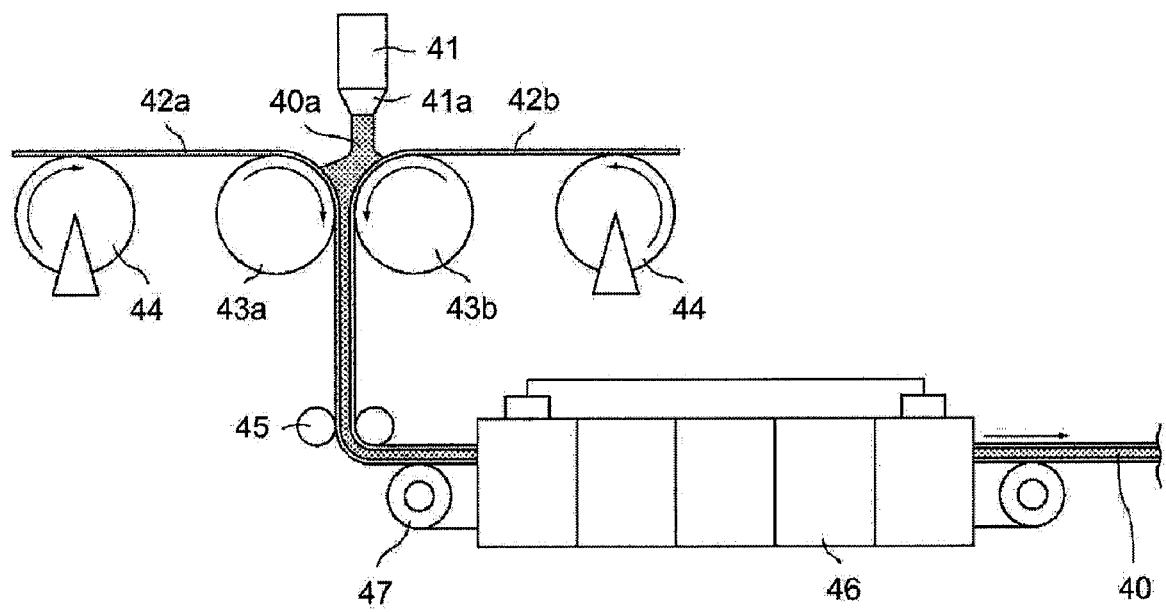
FIG. 4 is a diagram showing a method of producing a protective layer of a surface protective film.

FIG. 4 shows a schematic diagram of a method of producing a protective layer. The method of producing a protective layer will be described below with reference to FIG. 4.

A material composition 40a containing at least a polycarbonate type polyol, an isocyanate (or a urethane prepolymer including them), an alcohol-based curing agent, optional additives, and a non-amine type catalyst is sent to a gap between first and second gap maintaining members 42a and 42b that are conveyed by a pair of transport rollers 43a and 43b that are disposed apart from each other using a casting machine 41. The first and second gap maintaining members 42a and 42b while holding the material composition 40a therebetween are introduced into a heating device 46. The material composition 40a that is held between the first and second gap maintaining members 42a and 42b is thermally cured, and thereby a polycarbonate type polyurethane sheet-like article 40 is obtained.

Here, in FIG. 4, 44 indicates a transport roller for conveying the first and second gap maintaining members 42a and 42b, 45 indicates an auxiliary roller, and 47 indicates a conveyer belt through which the first and second gap maintaining members 42a and 42b that hold the material composition 40a are transported into the heating device 46.

The first and second gap maintaining members 42a and 42b can be used without particular limitation as long as they are materials that do not thermally deform when the material composition is thermally cured. For example, an elongated film made of a polymer material such as polyethylene terephthalate (PET), polyethylene naphthalate (PEN), polycarbonate (PC), a cyclic olefin resin (COP), or polyimide (PI) can be used. In the schematic diagram shown in FIG. 4, an elongated film made of a polymer material is used as a gap maintaining member. However, an endless belt made of such a polymer material or a metal material such as aluminum can be used.

Since the first and second gap maintaining members 42a and 42b that hold the material composition 40a therebetween are pulled at the same tension and transported, a gap therebetween can be maintained at a constant size. The material composition 40a that is interposed between the first and second gap maintaining members 42a and 42b is cured while a constant thickness is maintained, and thereby a polycarbonate type polyurethane sheet-like article 40 having excellent thickness accuracy is obtained. According to the production method, it is possible to continuously mold the sheet-like article 40 having a thickness of 30 μm or more, which is not easily applied by coating, and has practical optical characteristics as a surface protective film of a display.

A position of a head part 41a of the casting machine 41 is preferably unevenly located on the side of one of the transport rollers rather than at the center of the transport rollers 43a and 43b (the center of the gap formed by the first and second gap maintaining members 42a and 42b), and an unevenly distributed distance is preferably equal to or less than the radius of the transport roller. That is, a part directly below the head part 41a of the casting machine 41 is preferably positioned from the center of the pair of transport rollers 43a and 43b to the central axis of one transport roller. In addition, the shortest distance between a tip of the head part 41a and the surface of the transport roller is preferably 5 cm or less. When the head part 41a is provided in this manner, it is possible to further improve thickness accuracy of the polycarbonate type polyurethane sheet-like article 40, bubbles are unlikely to enter the uncured material composition 40a sent to the gap between the first and second gap maintaining members 42a and 42b, and entrained bubbles can easily escape.

The transport rollers 43a and 43b may simply have only a transport function, but are preferably heating rollers. When the transport rollers are heating rollers, the material composition 40a can be cured immediately after it is held in the gap between the first and second gap maintaining members 42a and 42b, it is possible to maintain the thickness more uniformly until the material composition 40a is introduced into the heating device 46, and it is possible to mold the polyurethane sheet-like article 40 having superior thickness accuracy. When the transport roller is heated, a transport surface temperature is preferably set to 10° C. to 60° C. When the temperature is lower than 10° C., the viscosity of the material composition 40a increases, bubbles cannot easily escape, a curing reaction occurs slowly, and the thickness accuracy of the sheet-like article 40 decreases. When the temperature exceeds 60° C., the material composition 40a is cured on the transport roller, and bubbles may enter the sheet-like article 40.

The heating device 46 is a heating furnace including a heater, and may be any device that can increase the temperature in the furnace to a curing temperature of the material composition 40a. In addition, heating conditions (curing conditions) in the heating device 46 are not particularly limited, and may be appropriately set according to a composition of the material composition 40a. For example, conditions of 40° C. to 160° C., and 1 minute to 180 minutes may be set.

An elongated laminate including the first gap maintaining member 42a, the polycarbonate type polyurethane sheet-like article 40, and the second gap maintaining member 42b is unloaded from the heating device 46. Then, the sheet-like article 40 becomes the protective layer 1 of the surface protective film of the present invention.

"Method of Producing Surface Protective Film Laminate"

In the above production method, one of the first gap maintaining member 42a and the second gap maintaining member 42b can serve as the transparent substrate film 2. In addition, the other of the first gap maintaining member 42a and the second gap maintaining member 42b can serve as the mold release film 4. Hereinafter, a case in which the first gap maintaining member 42a serves as the transparent substrate film 2, and the second gap maintaining member 42b serves as the mold release film 4 will be exemplified.

According to the above production method, an elongated laminate including the first gap maintaining member 42a serving as a transparent substrate film, the polycarbonate type polyurethane sheet-like article 40 serving as a protective layer, and the second gap maintaining member 42b serving as a mold release film is unloaded. In this case, preferably, a film on which no mold release treatment is performed is used as the first gap maintaining member 42a serving as a transparent substrate film, and a film on which a mold release treatment is performed is used as the second gap maintaining member 42b serving as a mold release film.

The elongated surface protective film laminate 30 of the present invention is obtained by forming the adhesive layer 3 on the surface of the first gap maintaining member 42a of the elongated laminate unloaded from the heating device by coating, and laminating the release film 5 on the adhesive layer 3. In addition, a laminate in which the transparent substrate film, the adhesive layer, and the release film are laminated in that order can be used as the first gap maintaining member 42a. In addition, when a film having irregularities is used as the second gap maintaining member 42b and the material composition 40a is held on a surface having irregularities, irregularities are transferred to the outermost surface of the sheet-like article 40, and anti-glare properties can be imparted to the obtained protective layer.

According to this production method, the surface protective film laminate 30 can be continuously produced in a so-called roll to roll manner. Since the produced surface protective film laminate 30 includes the mold release film 4 and the release film 5 on both surfaces, it can prevent scratches, contamination, and the like on the surface protective film 10, and it has excellent handling properties.

The surface protective film laminate that is wound in a roll form may be shipped or the surface protective film laminate that is cut into a sheet form may be shipped. In addition, an elongated laminate including the first gap maintaining member 42a, the polycarbonate type polyurethane sheet-like article 40, and the second gap maintaining member 42b or the laminate that is cut may be shipped, and the adhesive layer 3 may be formed by coating in a display factory or the like, and can be laminated on a transparent substrate of the display.

EXAMPLES

The present invention will be described below in further detail with reference to examples, and the present invention is not limited to these examples.

"Example 1"

100 g of a poly(1,6-hexane carbonate)diol (commercially available from Tosoh Corporation, product name: 980R) with a molecular weight of 2,000 and a hydroxyl value of 55, 52.4 g of isophorone diisocyanate, 16.0 g of an alcohol-based curing agent with a weight ratio of 1,4-butanediol/trimethylolpropane=60/40, and 250 ppm of an organic tin compound as a non-amine type catalyst were added, stirred and mixed together to prepare a material composition.

Then, a PET film with a thickness of 125 μm on which a silicone treatment was performed was used as a mold release film, a PET film with a thickness of 100 μm was used as a transparent substrate film, a silicone-based adhesive with a thickness of 50 μm was used as an adhesive layer, and a PET film with a thickness of 75 μm on which a silicone treatment was performed was used as a release film, and according to the above molding method, a surface protective film laminate 1 having a protective layer formed of a polycarbonate type polyurethane (with a thickness of 100 μm) was obtained.

"Example 2"

A surface protective film laminate 2 having a protective layer formed of a polycarbonate type polyurethane (with a thickness of 100 μm) was obtained in the same manner as in Example 1 except that a poly(3-methylpentane/1,6-hexane carbonate) diol (product name: C2090 commercially available from Kuraray Co., Ltd.) with a molecular weight of 2,000 and a hydroxyl value of 58 was used as a polyol component, and with respect to 100 g of a polyol, 53.2 g of isophorone diisocyanate and 16.1 g of an alcohol-based curing agent were used.

"Comparative Example 1"

A surface protective film laminate 3 having a protective layer (with a thickness of 100 μm) formed of a polyether type polyurethane was obtained in the same manner as in Example 1 except that a polytetramethylene ether glycol (product name: PTMG1500 commercially available from Mitsubishi Chemical Corporation) with a molecular weight of 1,500 and a hydroxyl value of 75 was used as a polyol component, and with respect to 100 g of a polyol, 37.1 g of diphenylmethane diisocyanate, and 7.0 g of an alcohol-based curing agent with a weight ratio of 1,4-butanediol/trimethylolpropane=80/20 were used.

"Comparative Example 2"

A surface protective film laminate 4 having a protective layer (with a thickness of 100 μm) formed of a polycaprolactone type polyurethane was obtained in the same manner as in Example 1 except that a poly(caprolactone)diol (product name: Placcel 220 commercially available from Daicel Corporation) with a molecular weight of 2,000 and a hydroxyl value of 56 was used as a polyol component, and with respect to 100 g of a polyol, 53.6 g of diphenylmethane diisocyanate, and 14.1 g of an alcohol-based curing agent with a weight ratio of 1,4-butanediol/trimethylolpropane=75/25 were used.

"Comparative Example 3"

A surface protective film laminate 5 having a protective layer (with a thickness of 100 μm) formed of a polyester type polyurethane was obtained in the same manner as in Example 1 except that a polyethylene adipate diol (product name: Sanesta 2060 commercially available from Sanyo Chemical Industries, Ltd.) with a molecular weight of 2,000 and a hydroxyl value of 56 was used as a polyol component, 60.1 g of diphenylmethane diisocyanate, and 16.3 g of an alcohol-based curing agent with a weight ratio of 1,4-butanediol/trimethylolpropane=80/20 were used.

"Experiment 1: Resistance to Plasticizer"

The mold release film was peeled off from the prepared surface protective films 1 to 5, and one droplet of the plasticizer shown in the following Table 1 dripped onto the protective layer. 3 minutes and 14 hours after dripping, the plasticizer was completely removed, and places in which the plasticizer dripped were visually checked and evaluated according to the following criteria.

○: no traces of droplets were observed.
Δ: place in which there were droplets was discolored or had slightly expanded.
x: place in which there were droplets had expanded.

"Experiment 2: Silicone-Based Additive"

0.5 g of a silicone-based additive shown in the following Table 2 was added to 100 g of the material composition used in Example 1 and a surface protective film was prepared in the same method as in Example 1.

The compatibility between the material composition and the silicone-based additive was evaluated according to the following criteria. In addition, a total light transmittance and a haze of the obtained surface protective film were measured according to the following method. Here, for those scoring x in the compatibility evaluation, a surface protective film was not produced as a thermally cured product, and evaluations other than the compatibility were not performed. The evaluation results are shown in Table 2.

"Evaluation Method"

Compatibility

○: the material composition and the silicone-based additive were compatible.
x: the material composition and the silicone-based additive were phase-separated.

TABLE 1

|  |  | Example 1 | Example 2 | Comparative Example 1 | Comparative Example 2 | Comparative Example 3 |
|---|---|---|---|---|---|---|
| Bis(2-ethylhexyl)phthalate | 3 min | ○ | ○ | Δ | Δ | ○ |
| Bis(2-ethylhexyl)adipate | 3 min | ○ | ○ | Δ | Δ | ○ |
| Diisononyl phthalate | 3 min | ○ | ○ | Δ | Δ | ○ |
| Polyetherester type | 3 min | ○ | ○ | Δ | Δ | Δ |
| plasticizer (product name: ADK CIZER RS735) | 14 h | ○ | Δ | X | X | X |

Examples 1 and 2 in which the protective layer was formed of a polycarbonate type polyurethane were not discolored and did not expand after 3 minutes with respect to representative plasticizers bis(2-ethylhexyl)phthalate (DOP), bis(2-ethylhexyl)adipate (DOA), and diisononyl phthalate (DINP).

Example 1 in which a polycarbonate type polyol had no branched structure was not discolored and did not expand after 14 hours with respect to polyetherester type plasticizer. In Example 2 in which a polycarbonate type polyol had a branched structure, no discoloration or expansion was observed after 3 minutes with respect to the polyetherester type plasticizer, but slight discoloration and expansion were observed after 14 hours.

Comparative Example 1 in which a protective layer was formed of an ether type polyurethane was inferior in the resistance to plasticizer, and slight discoloration and expansion were observed after 3 minutes with respect to all plasticizers.

Comparative Example 2 in which a protective layer was formed of a lactone type polyurethane was slightly inferior in the resistance to plasticizer, and slight discoloration and expansion were observed after 3 minutes with respect to all plasticizers. However, Comparative Example 2 was superior in the resistance to plasticizer compared to Comparative Example 1.

Comparative Example 3 in which a protective layer was formed of a polyester type polyurethane exhibited the same resistance to plasticizer as that of the polycarbonate type polyurethane with respect to representative plasticizers, DOP, DOA, and DINP. However, with respect to the polyetherester type plasticizer, the result was inferior to that of the polycarbonate type polyurethane, and slight discoloration and expansion were observed after 3 minutes and discoloration and expansion were observed after 14 hours.

Total Light Transmittance and Haze

A 5 cm square sample was cut out from the prepared surface protective film laminate, the mold release film and the release film were peeled off, the sample was set so that the protective layer surface was on the side of a light source, and a haze meter (device name: NDH-2000 commercially available from Nippon Denshoku Industries Co. Ltd.) was used for measurement.

Coefficients of Friction

A 15 cm×5 cm sample was cut out from the prepared surface protective film laminate, the mold release film and the release film were peeled off, and then a coefficient of static friction and a coefficient of dynamic friction on the side of the protective layer, and a variation in the coefficient of dynamic friction were measured under the following conditions.

Surface property measurement instrument (device name: TYPE14 commercially available from Shinto Science Co., Ltd.)

Load: 153 g

Speed: 700 mm/min

Counterpart component: POM (with a tip shape curvature radius of 0.65 mm)

Angle: 75 degrees

Coefficient of static friction: peak value during measurement

Coefficient of dynamic friction: average value when moved 10 cm

Variation in the coefficient of dynamic friction: a difference between a maximum value and a minimum value of the coefficient of dynamic friction when moved 10 cm.

TABLE 2

| Modified type | Silicone-based additive | Compatibility | Total light transmittance | Haze | Coefficient of static friction | Coefficient of dynamic friction | Variation in coefficient of dynamic friction |
|---|---|---|---|---|---|---|---|
| Polyether-modified polydimethylsiloxane | KF352A | o | 93.5 | 16.5 | 0.22 | 0.09 | 0.08 |
|  | KF615A | o | 92.3 | 4.1 | 0.21 | 0.11 | 0.03 |
|  | X22-4515 | o | 93.8 | 12.9 | 0.22 | 0.11 | 0.03 |
| Aralkyl-modified polydimethylsiloxane | KF410 | o | 93.2 | 4.7 | 0.30 | 0.21 | 0.02 |
| Long chain alkyl modified polydimethylsiloxane | KF412 | o | 93.6 | 13.5 | 0.30 | 0.21 | 0.02 |
| Dimethylsiloxane | KF96-50CS | x | — | — | — | — | — |
|  | KF96-500CS | x | — | — | — | — | — |
|  | KF96-1000CS | x | — | — | — | — | — |
|  | KF96-5000CS | x | — | — | — | — | — |
| Phenyl-modified polydimethylsiloxane | KF50-1000CS | x | — | — | — | — | — |
| Higher fatty acid ester-modified polydimethylsiloxane | KF910 | x | — | — | — | — | — |
| Example 1 (without silicone-based additive) | — | — | 92.6 | 1.29 | 0.19 | 0.18 | 0.01 |

It was confirmed that those in which a silicone-based additive that was compatible with a material composition was added satisfied the total light transmittance and the haze at which a cured product was usable as a surface protective film. In particular, a silicone-based additive formed of a polyether-modified polydimethylsiloxane had about a half of a coefficient of dynamic friction of the surface protective film compared to those having no silicone-based additive and excellent sliding properties.

"Example 3"

A surface protective film laminate 6 was obtained in the same manner as in Example 1 except that the thickness of the protective layer was 150 μm.

"Experiment 3: Load-Displacement Measurement"

The mold release film and the release film were peeled off from the surface protective film laminate 6 obtained in Example 3 and a protective layer with a thickness of 150 μm was then attached to a measurement table with an adhesive layer therebetween. An amount of displacement when a load was applied to the protective layer with a pen tip of a touch pen (tip shape, hemispherical shape with a diameter of 1.4 mm, commercially available from Wacom Co., Ltd.) made of a polyacetal resin (POM) was measured. Here, an amount of displacement was measured by applying a load of 0 gf to 500 gf which is an upper limit of a writing pressure for a general person.

For comparison, one sheet of general copy paper (with a thickness of 0.09 mm and a basis weight of 67 g/m²), two overlapping sheets thereof, and three overlapping sheets thereof were pressed with an annular weight (100 gf), and an amount of displacement when a load was applied to the annular center of paper with a pen tip of a commercially available ballpoint pen (with a ball diameter of 1.0 mm) was measured in the same manner.

Figure 5:
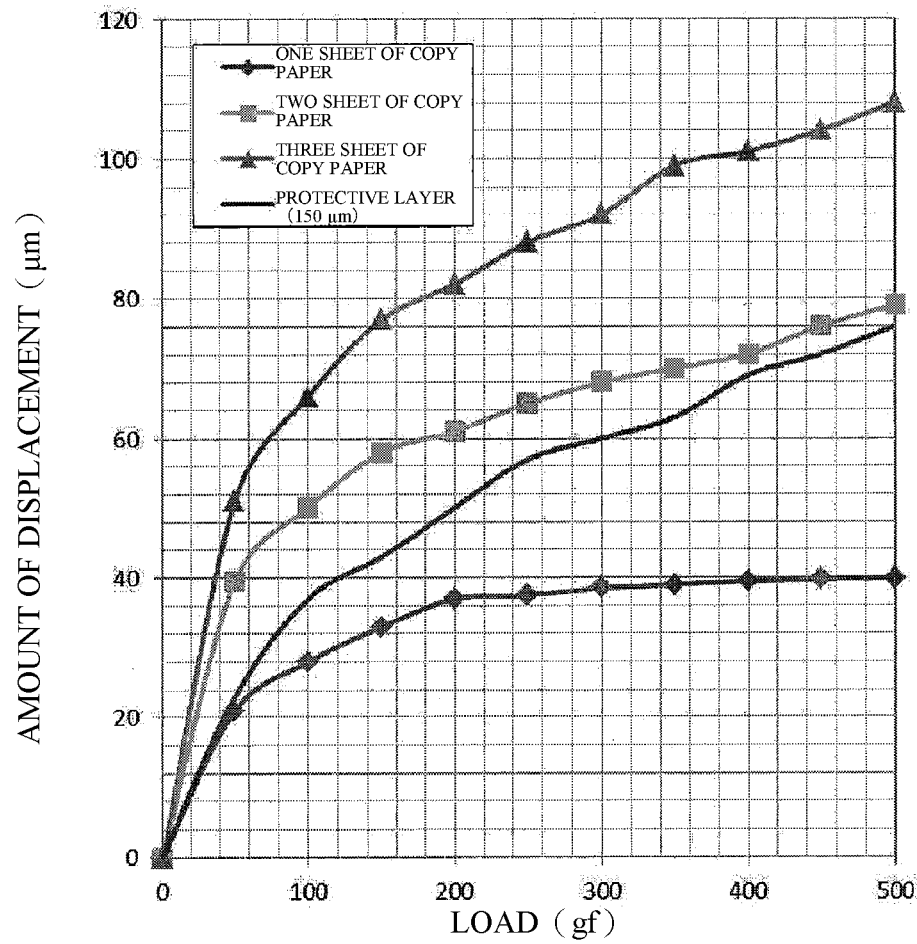
FIG. 5 is a diagram showing measurement results of an amount of displacement in Experiment 3.

FIG. 5 shows a graph showing a measured load-displacement.

It was confirmed that an amount of sinking displacement was a maximum of about 40 μm in one sheet of paper, a maximum of about 80 μm in two sheets of paper, and a maximum of about 108 μm in three sheets of paper.

The protective layer (with a thickness of 150 μm) of the surface protective film of the present invention had a maximum sinking displacement of about 76 μm, and this amount of displacement was equivalent to that of 1.9 sheets of paper.

That is, it was confirmed that, when the surface protective film of the present invention was traced with a touch pen, almost the same writing feeling as that of writing on paper with a ballpoint pen was obtained.

What is claimed is:

1. A surface protective film comprising:
at least three layers including a protective layer, a transparent substrate film, and an adhesive layer laminated in that order,
wherein the protective layer is formed of a polycarbonate-based polyurethane,
the protective layer is on an outermost surface of the surface protective film,
the protective layer contains a silicone-based additive, the silicone-based additive is any one selected from the group consisting of a polyether-modified polydimethylsiloxane, a polyaralkyl-modified polydimethylsiloxane, and a long chain alkyl-modified polydimethylsiloxane,
a thickness of the protective layer is 50 μm or more and 300 μm or less,
the polycarbonate-based polyurethane does not have an acrylic framework or a methacrylic framework,
the transparent substrate film is a single substrate,
a haze value of the surface protective film is 0.1% or more and 40% or less, and
the polycarbonate-based polyurethane is a thermosetting polyurethane.

2. The surface protective film according to claim 1, wherein the polycarbonate-based polyurethane is a cured product of a material composition containing a polycarbonate-based polyol, an isocyanate, and an alcohol-based curing agent.

3. A surface protective film laminate comprising:
a mold release film laminated on a surface on the side of the protective layer of the surface protective film according to claim 1; and
a release film laminated on the other surface of the surface protective film.

4. A method of producing a surface protective film having at least three layers including a protective layer, a transparent substrate film, and an adhesive layer laminated in that order, the protective layer being formed of a polycarbonate-based polyurethane, the protective layer being on an outermost surface of the surface protective film, comprising:

pouring a material composition containing a polycarbonate-based polyol, an isocyanate, an alcohol-based curing agent, and a catalyst into a gap between first and second gap maintaining members that are conveyed by a pair of rollers that are disposed apart from each other; and thermally curing the material composition that is held between the first and second gap maintaining members to form the protective layer, wherein the polycarbonate-based polyurethane does not have an acrylic framework or a methacrylic framework, the protective layer contains a silicone-based additive, the silicone-based additive is any one selected from the group consisting of a polyether-modified polydimethylsiloxane, a polyaralkyl-modified polydimethylsiloxane, and a long chain alkyl-modified polydimethylsiloxane, a thickness of the protective layer is 50 μm or more and 300 μm or less, the transparent substrate film is a single substrate, and a haze value of the surface protective film is 0.1% or more and 40% or less.

5. The method of producing a surface protective film according to claim 4, wherein one of the first and second gap maintaining members is used as the transparent substrate film of the surface protective film.

6. The method of producing a surface protective film according to claim 4, wherein one of the first and second gap maintaining members is a film on which no mold release treatment is performed and the other thereof is a film on which a mold release treatment is performed.

7. The method of producing a surface protective film according to claim 4, wherein the other of the first and second gap maintaining members is a film having irregularities and the material composition is held on a surface having the irregularities.

\* \* \* \* \*